(12) United States Patent
Lee et al.

(10) Patent No.: US 8,120,623 B2
(45) Date of Patent: Feb. 21, 2012

(54) APPARATUSES FOR OVERLAYING IMAGES, PORTABLE DEVICES HAVING THE SAME AND METHODS OF OVERLAYING IMAGES

(75) Inventors: Dong-Ki Lee, Seongnam (KR); Jung-Bum Oh, Seongnam (KR)

(73) Assignee: KT Tech, Inc., Gyeonggi-do (KR)

(*) Notice: Subject to any disclaimer, the term of this patent is extended or adjusted under 35 U.S.C. 154(b) by 685 days.

(21) Appl. No.: 12/225,099

(22) PCT Filed: Mar. 15, 2007

(86) PCT No.: PCT/KR2007/001271
§ 371 (c)(1),
(2), (4) Date: Sep. 12, 2008

(87) PCT Pub. No.: WO2007/105918
PCT Pub. Date: Sep. 20, 2007

(65) Prior Publication Data
US 2009/0033680 A1    Feb. 5, 2009

(30) Foreign Application Priority Data

Mar. 15, 2006 (KR) .................. 10-2006-0023979
Mar. 15, 2006 (KR) .................. 10-2006-0023988

(51) Int. Cl.
*G09G 5/00* (2006.01)
(52) U.S. Cl. ......... 345/639; 345/592; 715/768; 715/803
(58) Field of Classification Search .................. 345/639, 345/592; 715/768, 803
See application file for complete search history.

(56) References Cited

U.S. PATENT DOCUMENTS

| 5,651,107 A | * | 7/1997 | Frank et al. | .................... 715/768 |
| 6,008,804 A | * | 12/1999 | Pommier et al. | ............... 715/753 |
| 6,072,489 A | * | 6/2000 | Gough et al. | .................. 715/803 |

(Continued)

FOREIGN PATENT DOCUMENTS

KR    10-0195713    2/1999

(Continued)

OTHER PUBLICATIONS

Office Action issued on Jul. 24, 2007 in corresponding Korean Patent Application No. 10-2006-0023988.

*Primary Examiner* — M Good Johnson
(74) *Attorney, Agent, or Firm* — Harness, Dickey & Pierce, P.L.C.

(57) ABSTRACT

An apparatus for overlaying images includes a broadcast image layer generator, an application image layer generator, and an overlay processor. The broadcast image layer generator generates a broadcast image layer based on a received broadcast signal. The application image layer generator generates an application image layer based on an application image. The overlay processor generates an overlay image obtained by overlaying the broadcast image layer with the application image layer, so that a broadcast image corresponding to the broadcast image layer and an application image corresponding to the application image layer may be displayed simultaneously on a screen. The broadcast image and the application image may be displayed simultaneously on a screen, and visibility and readability of a text in the application image may be enhanced based on the user's preference and the user's recognition ability when the portable device performs multi-tasking in which multiple programs are simultaneously executed.

26 Claims, 12 Drawing Sheets

U.S. PATENT DOCUMENTS

| | | | |
|---|---|---|---|
| 6,429,883 B1 * | 8/2002 | Plow et al. | 715/768 |
| 6,473,102 B1 * | 10/2002 | Rodden et al. | 715/788 |
| 6,981,227 B1 * | 12/2005 | Taylor | 715/768 |
| 7,019,757 B2 | 3/2006 | Brown et al. | 345/592 |
| 7,020,845 B1 | 3/2006 | Gottfurcht et al. | 715/853 |
| 7,064,759 B1 * | 6/2006 | Feierbach et al. | 345/469.1 |
| 7,168,048 B1 * | 1/2007 | Goossen et al. | 715/797 |
| 7,312,798 B2 * | 12/2007 | Yach et al. | 345/589 |
| 7,429,993 B2 | 9/2008 | Hui | 345/629 |
| 7,543,242 B2 | 6/2009 | Goossen et al. | 715/797 |
| 7,546,543 B2 * | 6/2009 | Louch et al. | 715/762 |
| 7,673,250 B2 * | 3/2010 | Taylor | 715/768 |
| 7,847,800 B2 * | 12/2010 | Harper | 345/502 |
| 7,873,910 B2 * | 1/2011 | Chaudhri et al. | 715/764 |
| 7,907,146 B2 * | 3/2011 | Zimmer | 345/581 |
| 2003/0142138 A1 * | 7/2003 | Brown et al. | 345/797 |

FOREIGN PATENT DOCUMENTS

| | | |
|---|---|---|
| KR | 1999-0035363 | 5/1999 |
| KR | 10-2005-0044839 | 5/2005 |
| KR | 10-2005-0091246 | 9/2005 |
| WO | WO 01/24518 | 9/2000 |

* cited by examiner

APPARATUSES FOR OVERLAYING IMAGES, PORTABLE DEVICES HAVING THE SAME AND METHODS OF OVERLAYING IMAGES

TECHNICAL FIELD

Example embodiments of the present invention relates to image processing devices having image overlay function, portable devices having the same and methods of overlaying images, and more particularly relates to image processing devices having image overlay function, portable devices having the same and methods of overlaying images employed in a portable device capable of receiving digital broadcast.

BACKGROUND ART

Recently, the terrestrial digital multimedia broadcasting (hereinafter, referred to as "T-DMB") service is launched around the metropolitan area so that a user may receive various digital broadcasting on the roads using portable device such as mobile communication device, DMB receiver, PDA (Personal Digital Assistants), etc.

T-DMB service provides not only high definition TV programs and CD-quality audio but also data services such as live traffic information, news and information. In addition, T-DMB can provide high quality and seamless service even in a vehicle moving in a velocity of up to 200 km/h.

However, in conventional portable device, when an application—e.g. SMS(Short message Service), phone book—is initiated while a user watches a T-DMB, the T-DMB image displayed on a screen may be switched to the initiated application image.

For example, in case that a user presses a key for verifying the received SMS message while the T-DMB image is displayed on the screen of the portable device, the T-DMB image on the screen may be switched to SMS image.

Accordingly, the conventional portable device does not satisfy the demand for using various functions simultaneously because an application image and a broadcast image may not be displayed at the same time on the screen.

DISCLOSURE OF THE INVENTION

Technical Problem

Accordingly, the present invention is provided to substantially obviate one or more problems due to limitations and disadvantages of the related art.

It is a feature of the present invention to provide an apparatus for overlaying a plurality of images for the purpose of displaying a broadcast image and an application image simultaneously on a screen.

It is another feature of the present invention to provide a portable device having the apparatus for overlaying a plurality of images for the purpose of displaying a broadcast image and an application image simultaneously on a screen.

It is still another feature of the present invention to provide a method of overlaying a plurality of images for the purpose of displaying a broadcast image and an application image simultaneously on a screen.

Technical Solution

In one example embodiment, an apparatus for overlaying a plurality of images includes a broadcast image layer generator configured to generate a broadcast image layer based on a received broadcast signal; an application image layer generator configured to generate an application image layer based on an application image; and an overlay processor configured to generate an overlay image obtained by overlaying the broadcast image layer with the application image layer, so that a broadcast image corresponding to the broadcast image layer and an application image corresponding to the application image layer may be displayed simultaneously on a screen. The overlay processor may adjust a degree of a translucency of the application image to generate the overlay image. When a current pixel included in the application image represents an image, the application image layer generator may add an Alpha value corresponding to a setting value of a translucency to a color information of the current pixel, and when the current pixel included in the application image represents a text, the application image layer generator may add a setting value, which represents that the current pixel is included in the text, to the color information. When the application image includes a text, the overlay processor may obtain an average color of a text background area of the broadcast image, may obtain an complementary color of the average color, may set the text background area as the average color and may set the text as the complementary color. The text background area may has dimensions corresponding to a product of a width and a height of the text, and the text background area of the broadcast image layer may correspond to an area of the text of the application image layer. When the application image includes a text, the overlay processor may obtain a color information of a pixel of the broadcast image at a position, which corresponds to the position of a pixel of the application image, on the broadcast image layer, may obtain a complementary color of the obtained color information, and may set the complementary color as a color of the text. When the broadcast image represents a color image, the broadcast image layer generator may convert the broadcast image into a gray scale image. The broadcast image layer generator may convert a color information of each pixel included in the broadcast image by adding a Alpha value to the color information of each pixel included in the broadcast image. The application image layer generator may generate the application image layer based on a setting value of an image effect which is set by a user. The apparatus may further include an image effect setting module configured to generate a setting value of an image effect based on an information of image effect which is set by a user, and may provide the setting value of the image effect to the application image layer generator. The setting value of the image effect may include at least one of a degree of a translucency and a color information of a text which is included in the application image.

In other example embodiment, a portable device having an image overlaying function includes a broadcast receiver configured to output a video signal based on a received broadcasting signal; an application running module configured to execute an application; an image processor configured to generate a broadcast image layer based on the broadcast signal, configured to generate an application image layer based on an image of the executed application, configured to generate an overlay image obtained by overlaying the broadcast image layer with the application image layer, so that a broadcast image corresponding to the broadcast image layer and an application image corresponding to the application image layer may be displayed simultaneously on a screen; and a display configured to display the overlay image. The image processor may adjust a degree of a translucency of the application image to generate the overlay image. When a pixel included in the application image represents an image, the image processor may add an Alpha value corresponding to a setting value of a translucency to a color information of the pixel, and when the pixel included in the application image represents a text, the image processor may add a setting value, which represents that the pixel is included in the text, to a color information of the pixel, and the image processor may generate the overlay image based on the added color information. When the application image includes a text, the image processor may obtain an average color of a text background area of the broadcast image, may obtain an complementary color of the average color, and may set the text background area as the average color and may set the text as the complementary color. When the application image includes a text, the image processor may obtain a color information of a pixel of the broadcast image at a position, which corresponds to the position of a pixel of the application image, on the broadcast image layer, may obtain a complementary color of the obtained color information, and may set the complementary color as a color of the text. When the broadcast image represents a color image, the image processor may convert the broadcast image into a gray scale image. The image processor may generate the application image based on a setting value of an image effect which is set by a user. The portable device may further include a memory configured to store the setting value of the image effect.

In still other example embodiment, a portable device includes an application running module configured to execute at least one application; a display configured to display an image of the executed application; a first image layer generator configured to receive a first application image from the application running module to generate a first application image layer; a second image layer generator configured to receive a second application image from the application running module to generate a second application image layer; and an overlay processor configured to generate an overlay image obtained by overlaying the first application image layer with the second application image layer, so that a first image corresponding to the first application image layer and a second image corresponding to the second application image layer may be displayed simultaneously on a screen. The second image layer generator may convert a color information of the second application image layer so that the second image has a given degree of a translucency. When a pixel included in the second application image represents an image, the second image layer generator may add an Alpha value corresponding to a setting value of a translucency to a color information of the pixel, and when the pixel included in the second application image represents a text, the second image layer generator may add a setting value, which represents that the pixel is included in the text, to a color information of the pixel. When the second image includes a text, the overlay processor may obtain an average color of a text background area of the first image, may obtain an complementary color of the average color, may set the text background area as the average color, and may set the text as the complementary color. When the second image includes a text, the overlay processor may obtain a color information of a pixel of the first image at a position, which corresponds to the position of a pixel of the second image, on the first image layer, may obtain a complementary color of the obtained color information, and may set the complementary color as a color of the text.

In still other example embodiment, a method of overlaying a plurality of images includes generating a broadcast image layer based on a received broadcast signal; generating an application image layer based on an application image; and generating an overlay image obtained by overlaying the broadcast image layer with the application image layer, so that a broadcast image corresponding to the broadcast image layer and an application image corresponding to the application image layer may be displayed simultaneously on a screen. The generating an application image layer may include adding an Alpha value corresponding to a setting value of a translucency to a color information of the a pixel included in the application image when the pixel represents an image and adding a setting value, which represents that the pixel is included in a text, to a color information of the pixel when the pixel represents a text. The generating an overlay image may include obtaining an average color of a text background area of the broadcast image when the application image includes a text, obtaining an complementary color of the average color, setting the text background area as the average color and setting the text as the complementary color. The text background area may have dimensions corresponding to a product of a width and a height of the text, and the text background area of the broadcast image layer may correspond to an area of the text of the application image layer. The generating an overlay image may include obtaining a color information of a pixel of the broadcast image at a position, which corresponds to the position of a pixel of the application image, on the broadcast image layer when the application image includes a text, obtaining a complementary color of the obtained color information and setting the complementary color as a color of the text. The generating a broadcast image layer may include converting the broadcast image into a gray scale image when the broadcast image represents a color image. The generating an application image layer may generate the application image layer based on a setting value of an image effect which is set by a user. The setting value of image effect may include at least one of a degree of a translucency and a color information of a text which is included in the application image. The generating a broadcast image layer may convert a color information of each pixel included in the broadcast image by adding a Alpha value to the color information of each pixel included in the broadcast image.

Advantageous Effects

According to portable devices having image overlay function, when an application is executed while the portable device displays a broadcast image, the application image is processed to have a given degree of translucency, the broadcast image is overlaid with the application image, thereby generating an overlay image. The overlay image may be generated based on setting value of image effect which is set by a user.

Accordingly, the broadcast image and the application image may be displayed at the same time on the screen, and visibility and readability of a text in the application image may be enhanced based on the user's preference and the user's recognition ability when the portable device performs multi-tasking in which multiple programs are simultaneously executed.

DESCRIPTION OF DRAWINGS

Example embodiments of the present invention will become more apparent by describing in detail example embodiments of the present invention with reference to the accompanying drawings, in which.

BEST MODE FOR CARRYING OUT THE INVENTION

Figure 1:
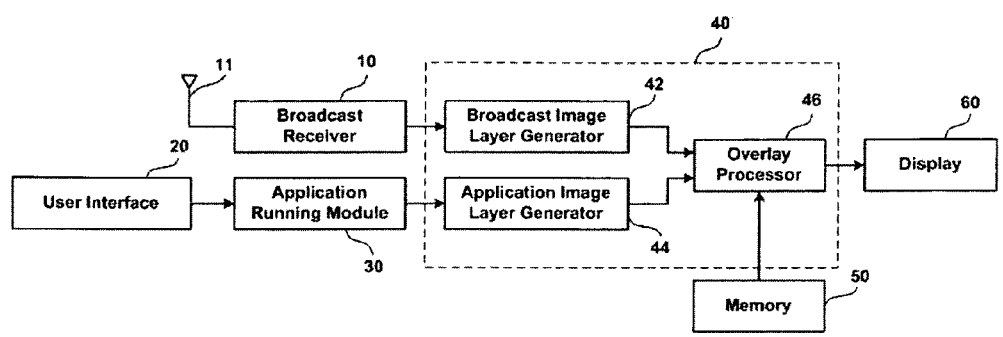
FIG. 1 is a block diagram illustrating a potable device having image overlay function according to one example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a potable terminal having image overlay function according to one embodiment of the present invention.

Referring to FIG. 1, the portable device having image overlay function includes a broadcast receiver 10, a user interface 20, an application running module, an image processor 40, a memory 50 and a display 60. The image processor 40 includes a broadcast image layer generator 42, an application image layer generator 44 and an overlay processor.

The detailed configuration of the broadcast receiver 10 is not shown in the drawing because the configuration of the broadcast receiver 10 is well known to those skilled in the art. The broadcast receiver 10 receives broadcasting signals through an antenna 11, selects a broadcasting signal having a specific frequency from the received broadcasting signals, converts the selected broadcasting signal into a baseband signal. A channel decoder in the broadcast receiver 10 decodes the baseband signal to output packet stream.

The packet stream includes an audio signal, a video signal and a data signal. Each of the signals is decoded by respective corresponding source decoder in the broadcast receiver 10 so that the broadcast receiver 10 outputs the decoded signals. Hereinafter, the video signal among the decoded signals outputted from the broadcast receiver 10 will be described in the example embodiments of the present invention.

The broadcast receiver 10 may receive at least one of a Digital Multimedia Broadcasting (DMB) signal and a digital broadcasting signal.

The user interface 20 receives input for selecting specific function from a user. For example, the user interface 20 may include a function selecting button for running application.

The user interface 20 provide interface for selecting specific function to the user, and the user interface 20 outputs information corresponding to the application selected by the function selecting button pushed by the user.

In addition, the user interface 20 may provide a user with interface through which the user sets display effect of application image, and may output information corresponding to the display effect, which is established by user, of application image.

The application running module 30 executes a selected application based on information about the application that the user selects through the user interface 20, and outputs an application image of the selected application. In addition, although the application is not selected by a user, in case of certain event such as Short Message Service (SMS), the application running module 30 may automatically execute application corresponding to the certain event.

The broadcast image layer generator 42 receives a video signal from the broadcast receiver 10, and then generates a broadcast image layer. Hereinafter, the broadcast image layer represents the lowest layer among the image layers that are displayed on the display 60 of the potable device.

Each of pixels in the broadcast image layer has color ingredient that is obtained based on a combination of R (Red), G (Green) and B (Blue). The broadcast image layer may also have gray scale image instead of color image.

In case that the broadcast image layer is represented using gray scale, first, R, G and B color information for one pixel are read, and then the read R, G and B color information are converted into an HSV (Hue Saturation Value) color information or an YCbCr color information. Each of R, G and B values are replaced by one value, such as an Y value, obtained from the converted color information (HSV or YcbCr) so that each of R, G and B values has the same value—i.e. the same Y value—, and above processes are applied repeatedly to all pixels of the broadcast image layer.

When a certain application is executed while the portable device displays a broadcast image, the application image layer generator 44 generates the application image layer correspond to the executed application.

The application image layer generator 44 receives the application image from the application running module 30, and then sets a background color, i.e. mask color, of the application image layer. For example, the background color may be pink. The application image layer generator 44 reads a pixel information of the application image, and then in case that the pixel information corresponds to image, the application image layer generator 44 converts R, G and B of color information into Alpha, R, G and B.

The Alpha value represents degree of a translucency of a pixel. The Alpha value may be selected from 0 to 255 according to the degree of the translucency level. For example, in case that the Alpha value is 255, the pixel may be set opaquely, and in case that the Alpha value is 0, the pixel may be set transparently.

The application image layer generator 44, in case that the pixel information corresponds to a text, converts R, G and B of the color information into Mark, R, G and B. The Mark value is used as a delimiter, e.g. '−1' representing that a current pixel is one of the pixels that compose a text.

In addition, in case that the broadcast image layer is represented by the gray scale, the application image layer generator 44 converts R, G and B of the color information of the text pixel into Alpha, R, G and B, and above process is applied repeatedly to all pixels of the broadcast image layer.

The overlay processor 46 receives a broadcast image layer from the broadcast image layer generator 42, and receives an application image layer from the application image layer generator 44. And then, the overlay processor 46 generates an overlay image, which is obtained by overlaying the broadcast image with the application image that is treated to have translucency effect, based on the background color, i.e. mask color, and the Alpha value.

In case that the application image layer includes a text such as Short Message Service (SMS) message, the overlay processor 46 obtains a complementary color for an average color of a text background area corresponding to an area comprised of width and height of the text, and then sets the complementary color as a color of the text, and display the text. Here, the text background area has dimensions correspond to a product of the width and the height of the text and the text background area represents an area of the broadcast image layer corresponding to the text.

Concretely, the overlay processor 46 receives pixel information from the application image layer generator 44, and then, in case of the pixel information includes the Mark value, the overlay processor 46 obtains position of a current pixel on the application image layer, and then, obtains a text background area at a position, which corresponds to the position of the current pixel, on the broadcast image layer, and then, obtains a color information of all pixels that are included in the obtained text background area. The text background area is obtained based on width and height of a predetermined font.

The overlay processor 46 obtains the average color using the color information of all pixels that are included in the obtained text background area. And then, the overlay processor 46 read the complementary color corresponding to the obtained average color from the memory 50. The text background area is displayed such that the text background area has the average color, and the text is displayed such that the text has the complementary color of the average color. Here, the Alpha value of the pixels included in the text may be set opaquely.

Above process is applied repeatedly to all text, so that the final processed image represents a string of text each having the complementary color of the text background area. Consequently, the readability of the text is improved.

In addition, according to another example embodiment of the present invention, in case that the application image layer includes a text, the overlay processor 46 obtains a color information of each pixel in the broadcast image layer. The position of each pixel in the broadcast image layer corresponds to the position of each pixel of the text included in the application image layer. And then, the overlay processor 46 obtains the complementary color of the obtained color information if each pixel, and sets the complementary color as the color of each pixel of the text, and displays the text having the complementary color.

The overlay processor 46 receives pixel information from the application image layer generator 44, and then, in case the pixel information includes the Mark value, the overlay processor 46 determines that a current pixel represents a text, and obtains a position of the current pixel on the application image layer. And then, the overlay processor 46 obtains a color information of a pixel having a position, which corresponds to the position of the current pixel of the application image layer, on the broadcast image layer.

The overlay processor 46 read a complementary color of the obtained color information from the memory 50. After this, the overlay processor 46 displays the complementary color as the color of the text in the application image layer.

Above process is applied repeatedly to all pixels of the text in the application image layer, so that each pixel of the text in the application image layer displays the complementary color of each pixel, which has a position corresponding to the position of a pixel in the broadcast image layer.

The broadcast image layer generator 42, the application image layer generator 44 and the overlay processor 46 may be embodied as one unit such as an image processor 40, and the image processor 40 may be embodied in a single semiconductor chip. Also, the broadcast image layer generator 42, the application image layer generator 44, the overlay processor 46 and the application running module 30 may be embodied in a single semiconductor chip. Also, the broadcast image layer generator 42, the application image layer 44, the overlay processor 46 and the application running module 30 may be embodied in software program that performs above function.

The memory 50 stores all color information, which can be represented by the display 60, and complementary color information of each of the all color information. The memory 50 can be embodied in a nonvolatile memory. The memory 50 may be included in the image processor 40.

The display 60 receives an overlay image in which a broadcast image is overlaid with an application image, and displays the overlay image.

Figure 2:
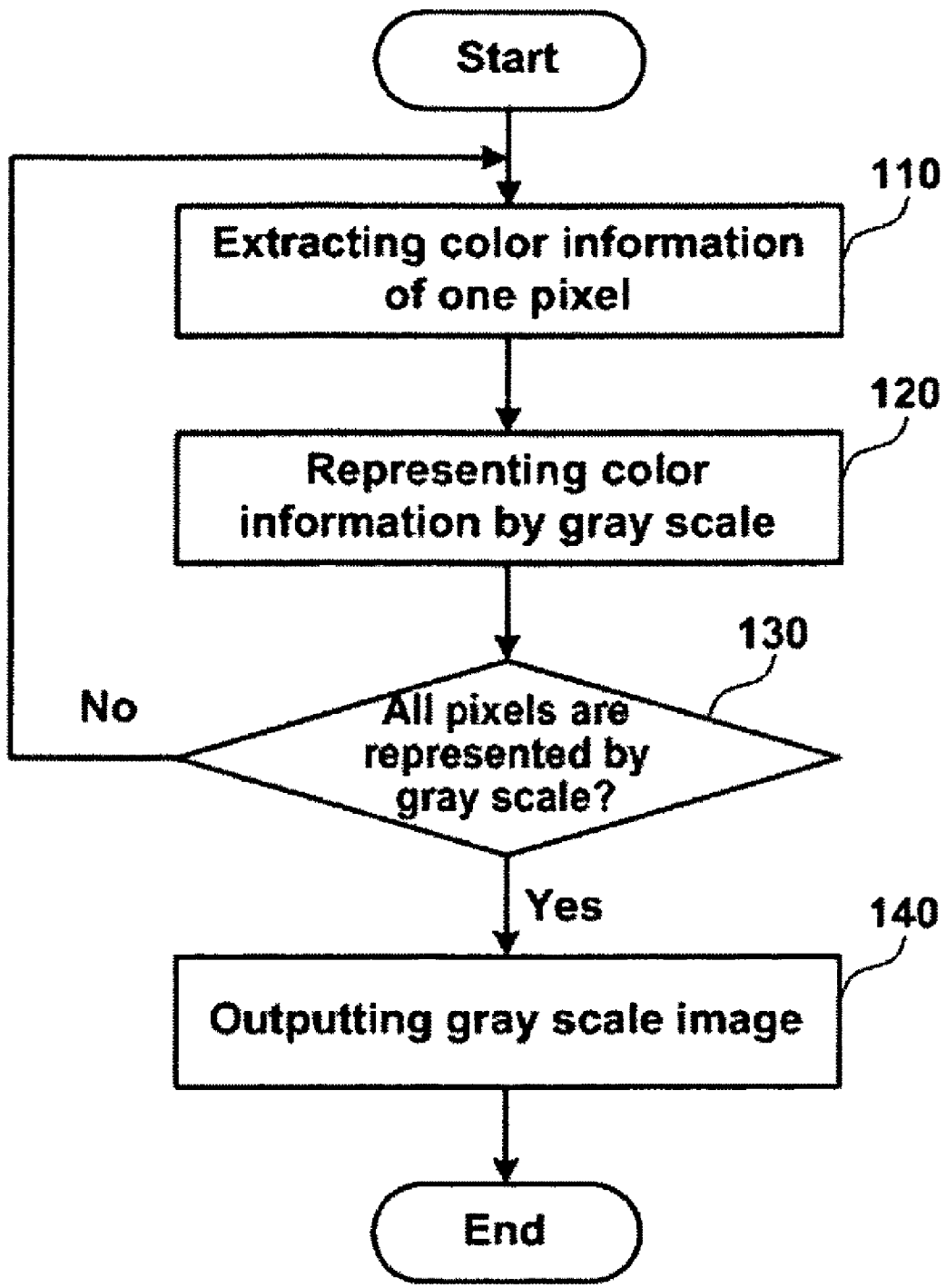
FIG. 2 is a flowchart illustrating operation of a broadcast image layer generator shown in FIG. 1.

FIG. 2 is a flowchart illustrating operation of a broadcast image layer generator shown in FIG. 1, and FIG. 2 shows that the broadcast image layer generator 42 converts the color image into the gray scale.

Referring to FIG. 2, the broadcast image layer generator 42 extracts color information from a one pixel of a video signal received from the broadcast receiver 10 (Step 110). The extracted color information includes R (Red), G (Green) and B (Blue) values. For example, each R, G and B value may be selected from 0 to 255.

And then, the broadcast image layer generator 42 converts the extracted R, G and B values into Y, Cb and Cr values using the expression 1, and replaces the R, G and B values with Y value (R=Y, G=Y, B=Y) so that the color image may be represented by the gray scale (Step 120).

$Y=0.299R+0.587G+0.114B$ $Cb=0.564(B-Y)$ $Cr=0.713(R-Y)$ [Expression 1]

In Step 130, the broadcast image layer generator 42 judges whether or not all pixels are converted to be represented by the gray scale. In case that all pixels are not represented by the gray scale, the process goes to the Step 110. In case that all pixels are represented by the gray scale, the broadcast image layer generator 42 outputs the gray scale image (Step 140).

Figure 3:
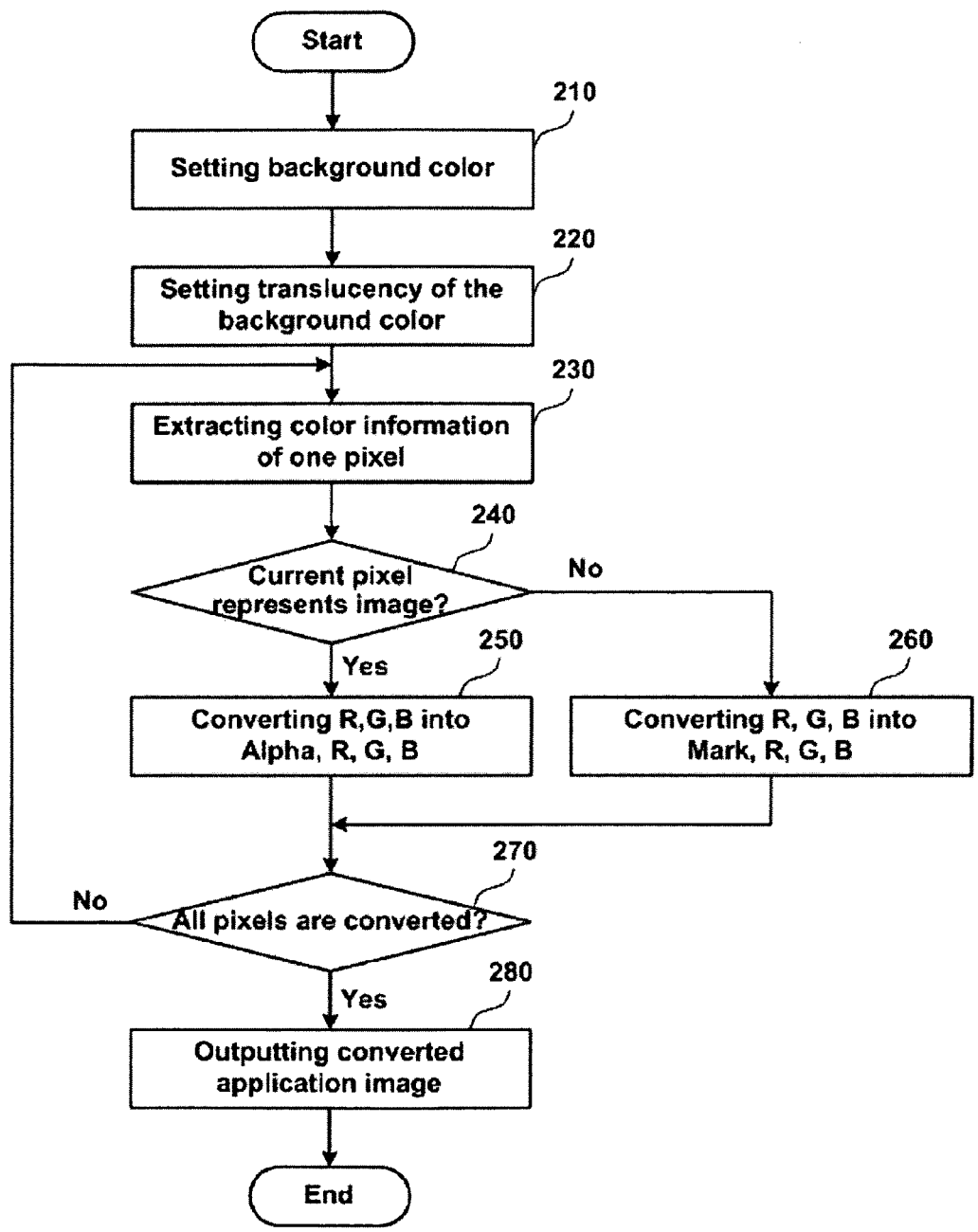
FIG. 3 is a flowchart illustrating operation of an application image layer generator shown in FIG. 1.

FIG. 3 is a flowchart illustrating operation of an application image layer generator shown in FIG. 1.

Referring to FIG. 3, the application image layer generator 44 receives an application image from the application running module 30, and then sets a background color, i.e. mask color, of the application image layer (Step 210).

In Step 220, the application image layer generator 44 sets the degree of the translucency of the background color.

The broadcast image layer should be overlaid with the application image layer, the application image layer generator 44 sets the background color and the translucency of the application image layer as a given value so that the broadcast image and the application image may be displayed at the same time on the screen.

In Step 230, the application image layer generator 44 extracts a pixel information, i.e. R, G and B values, in the application image.

In Step 240, the application image layer generator 44 verifies whether or not a current pixel is a pixel representing a text or a pixel representing an image.

In Step 250, in case that the current pixel represents an image, the application image layer generator 44 converts R, G and B values into Alpha, R, G and B values.

In Step 260, in case that the current pixel does not represent an image pixel, i.e. in case that the current pixel represents a text, the application image layer generator 44 converts R, G and B values of a pixel into Mark, R, G and B values of the pixel.

In Step 270, the application image layer generator 44 judges whether or not all pixels are converted.

In Step 280, in case that the all pixels are not converted, the operation goes to the Step 230, and then the application image layer generator 44 processes the Steps 230 through 260 sequentially until the all pixels are converted. In case that the all pixels are converted, the application image layer 44 outputs information of the converted application image.

In one example of embodiment of the present invention illustrated in FIG. 3, in case that the pixel represents the text, the application image layer generator 44 converts the R, G and B values into Mark, R, G and B values. In another example embodiment of the present invention, in case that the broadcast image layer is converted into the gray scale image, the application image layer generator 44 may convert the R, G and B values of a pixel representing a text into the Alpha, R, G and B values of the pixel.

Figure 4:
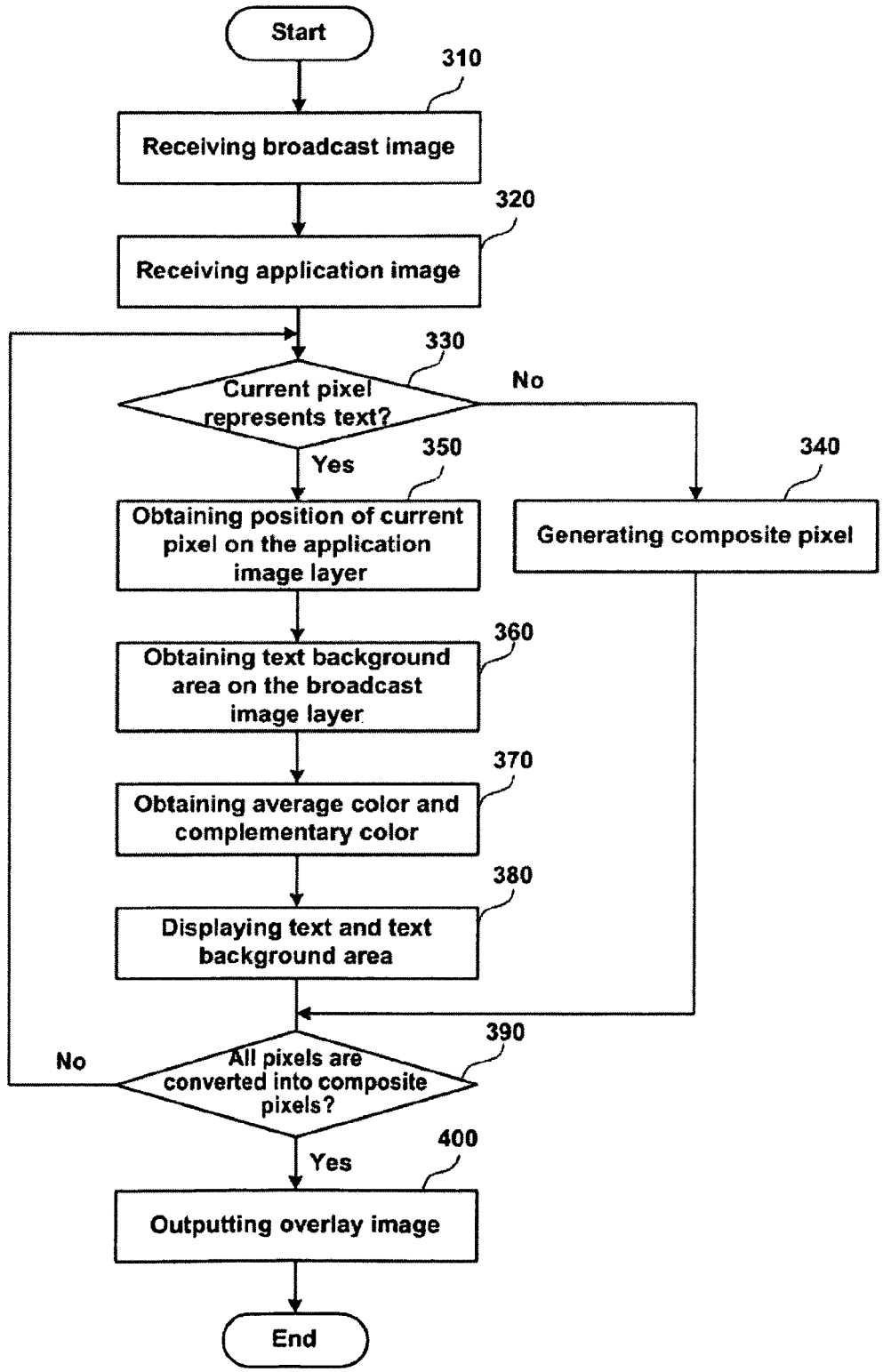
FIG. 4 is a flowchart illustrating operation of an overlay processor shown in FIG. 1 according to one example embodiment of the present invention.

FIG. 4 is a flowchart illustrating operation of an overlay processor shown in FIG. 1 according to one example embodiment of the present invention.

Referring to FIG. 4, the overlay processor 46 receives the broadcast image from the broadcast image layer generator 42 (Step 310).

And then, in Step 320, the overlay processor 46 receives the application image from the application image layer generator 44. Alternatively, the overlay processor 46 may receive the broadcast image after the overlay processor 46 receives the application image.

In Step 330, the overlay processor 46 judges whether or not a current pixel, which is included in the application image, is a pixel representing a text or a pixel representing an image. For example, in case that the pixel information includes the Alpha value, the overlay processor 46 may determine that the current pixel represents an image. In case that the pixel information includes the Mark value, the overlay processor 46 may determine that the current pixel represents the text.

In Step 340, in case that the current pixel of the application image represents an image, the overlay processor 46 generates a composite pixel based on the current pixel of the application image and a pixel having a position, which corresponds to the position of the current pixel of the application image layer, on the broadcast image layer. The overlay processor 46 generates the composite pixel using the Alpha value of the current pixel of the application image so that the composite pixel has a given degree of translucency corresponding to the Alpha value.

In Step 350, in case that the current pixel of the application image represents a text, the overlay processor 46 obtains a position of the current pixel on the application image layer.

And then, in Step 360, the overlay processor 46 obtains a text background area of the broadcast image layer at a position, which corresponds to the position of the text of the application image layer, on the broadcast image layer, and then obtains a color information of all pixels that are included in the obtained text background area. The dimension of the text background area has an area corresponding to an area obtained by a product of width and height of a predetermined font of a text.

In Step 370, the overlay processor 46 obtains an average color of the text background area using the color information of all pixels that are included in the obtained text background area, and then, reads a complementary color of the obtained average color from the memory 50.

In Step 380, the text background area is displayed such that the text background area has the average color, and the text is displayed such that the text has the complementary color of the average color. Here, the Alpha value of the pixels included in the text may be set opaquely.

And then, in Step 390, the overlay processor 46 judges whether or not all pixels are converted into composite pixels.

In Step 400, in case that all pixels are converted into the composite pixels, the overlay processor 46 outputs the composite image, i.e. an overlay image. In case that all pixels are not converted into the composite pixels, the operation goes to the Step 330, and the overlay processor 46 processes the Steps 330 through 390 sequentially until the all pixels are converted into the composite pixels.

Figure 5:
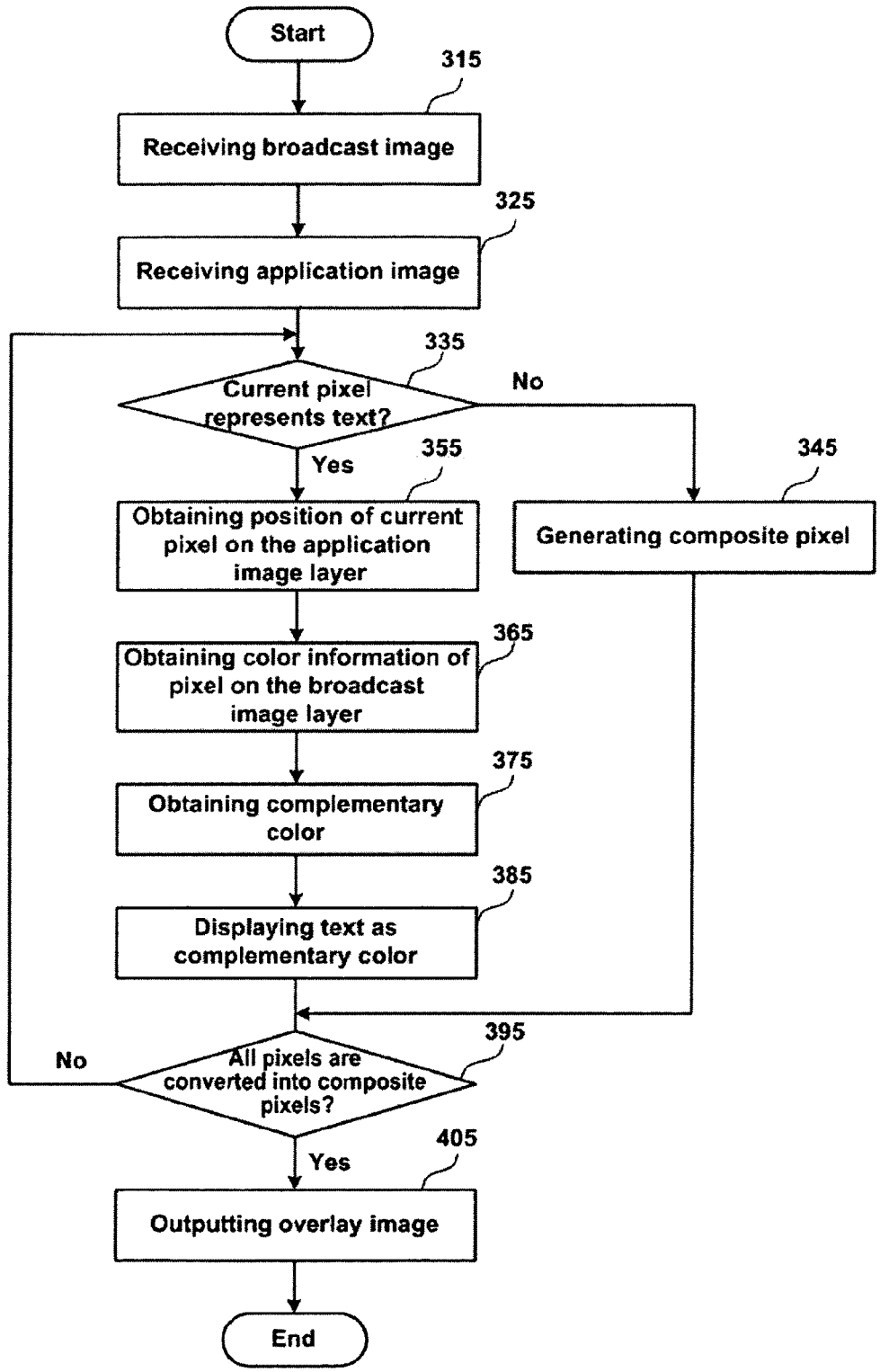
FIG. 5 is a flowchart illustrating operation of an overlay processor according to another example embodiment of the present invention.

FIG. 5 is a flowchart illustrating operation of an overlay processor according to another example embodiment of the present invention.

Referring to FIG. 5, the overlay processor 46 receives the broadcast image from the broadcast image layer generator 42 (Step 315).

And then, in Step 325, the overlay processor 46 receives the application image from the application image layer generator 44. Alternatively, the overlay processor 46 may receive the broadcast image after the overlay processor 46 receives the application image.

In Step 335, the overlay processor 46 judges whether or not a current pixel, which is included in the application image, is a pixel representing a text or a pixel representing an image. For example, in case that the pixel information includes the Alpha value, the overlay processor 46 may determine that the current pixel represents the image. In case that the pixel information includes the Mark value, the overlay processor 46 may determine that the current pixel represents the text.

In Step 345, in case that the current pixel of the application image represents an image, the overlay processor 46 generates a composite pixel based on the current pixel of the application image and a pixel having a position, which corresponds to the position of the current pixel of the application image layer, on the broadcast image layer. The overlay processor 46 generates the composite pixel using the Alpha value of the current pixel of the application image so that the composite pixel has a given degree of translucency corresponding to the Alpha value.

In Step 355, in case that the current pixel of the application image represents a text, the overlay processor 46 obtains a position of the current pixel on the application image layer.

And then, in Step 365, the overlay processor 46 obtains a color information of a pixel at a position, which corresponds to the obtained position of the current pixel of the application image, on the broadcast image layer.

In Step 375, the overlay processor 46 reads a complementary color of the obtained color from the memory 50.

In Step of 385, the pixel of the text is displayed such that the pixel of the text has the complementary color.

In Step 395, the overlay processor 46 judges whether of not all pixels are converted into composite pixels.

In Step 405, in case that all pixels are converted into the composite pixels, the overlay processor outputs the composite image, i.e. an overlay image. In case that all pixels are not converted into the composite pixels, the operation goes to the Step 335, and the overlay processor 46 processes the Steps 335 through 395 sequentially until the all pixels are converted into the composite pixels.

Figure 6:
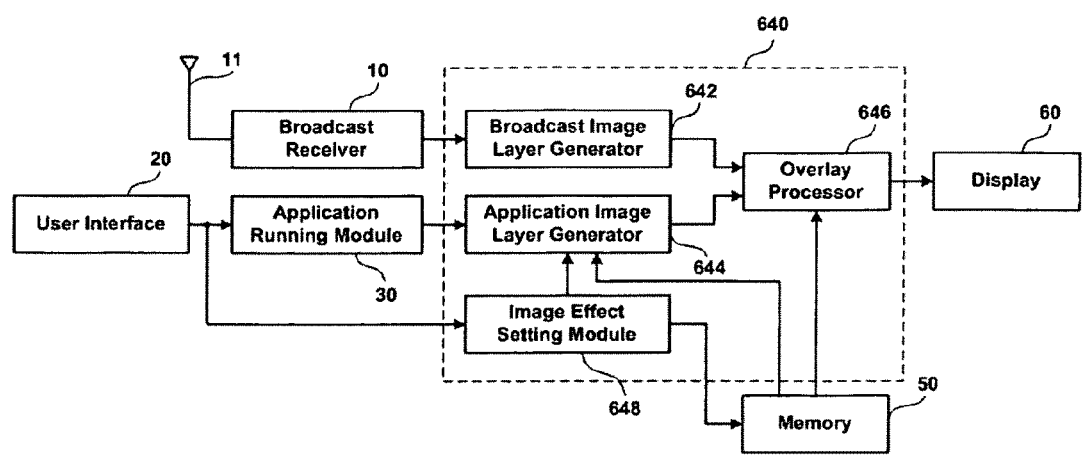
FIG. 6 is a block diagram illustration a portable device having image overlay function according to still another example embodiment of the present invention.

FIG. 6 is a block diagram illustration a portable device having image overlay function according to still another example embodiment of the present invention.

Referring to FIG. 6, the portable device having image overlay function includes a broadcast receiver 10, a user interface 20, an application running module 30, an image processor 640, a memory 50 and a display 60. The image processor 640 includes a broadcast image layer generator 642, an application image layer generator 644, an overlay processor 646 and an image effect setting module 648.

In FIG. 6, the same reference numerals denote the same elements in FIG. 1. The broadcast receiver 10, the user interface 20, the application running module 30 and the display 60 respectively performs the same function as that of the corresponding elements in FIG. 1, and thus detailed descriptions of the same elements will not be repeated.

The broadcast image layer generator 642 receives a video signal from the broadcast receiver 10, and then generates a broadcast image layer. The broadcast image layer generator 642 converts color information of each pixel, i.e. R, G and B, into Alpha, R, G and B. The Alpha represents the degree of translucency level.

The broadcast image layer generator 642 may also convert the broadcast image layer so that the broadcast image layer may be represented by a gray scale. In addition, the broadcast image layer generator 642 may change the degree of translucency level of the grey scale of the broadcast image layer by using the Alpha value.

When an application is executed while the portable device displays a broadcast image, the application image layer generator 644 generates the application image layer correspond to the executed application.

Here, in case that a user sets the degree of the translucency, the application image layer generator 644 reads the Alpha value of each pixel, which is included in the application image, from the memory 50, and then converts the color information of each pixel based on the Alpha value. In case that a user modifies the setting value of image effect of the application image while the overlay image is displayed on the display 60, the application image layer generator 644 receives the modified setting value of image effect from the image effect setting module 648, and then converts the color information of corresponding pixel, which included in the application image layer, based on the received setting value, i.e. modified setting value of image effect.

In case that the pixel information represents a text, the application image layer generator 644 reads the color information, i.e. R, G and B, and the Alpha value representing a degree of translucency from the memory 50, and then converts the color information of the pixel based on the read color information. In case that the user modifies the translucency or color of text while the overlay image is displayed on the display 60, the application image layer generator 644 converts the color information of corresponding pixel based on the modified information.

In case that the user does not set the image effect, the application image layer generator 644 converts color information of the application image layer based on a predetermined setting value that is stored in memory 50. Here, the predetermined setting value may be determined through reiterative experiments so that the predetermined setting value may provide better visibility and readability. The above processes are applied repeatedly to all pixels of the application image layer.

The overlay processor 646 receives a broadcast image layer from the broadcast image layer generator 642, and receives the application image layer from the application image layer generator 644, and the overlay processor 646 generates composite pixel based on a pixel of the broadcast image layer and a pixel having a position, which corresponds to the position of the pixel of the broadcast image layer, on the application image layer. The overlay processor 646 generates the composite pixel by using the Alpha values included in each pixel so that the composite pixel may have a given degree of translucency.

The image effect setting module 648 receives information of image effect from the user interface 20, and then outputs setting value of image effect. The image effect may be set by a user.

The information of image effect, which can be set by the user, may include a degree of translucency of an application image, a degree of translucency of a text included in application image, and a color of the text.

For example, when the user sets the color of a text as red, the image effect setting module 648 outputs a setting value, e.g. 'FF0000', corresponding to red. When the user sets the translucency of the text as opacity, the image effect setting module 648 outputs a setting value, e.g. 'FF', corresponding to opacity.

The broadcast image layer generator 642, the application image layer generator 644, the overlay processor 646 and the image effect setting module 648 may be embodied as one unit such as an image processor 640, and may be embodied in a single semiconductor chip. Alternatively, the broadcast image layer generator 642, the application image layer generator 644, the overlay processor 646, the image effect setting module 648 and the application running module 30 may be embodied in a single semiconductor chip. Alternatively, the broadcast image layer generator 642, the application image layer generator 644, the overlay processor, the image effect setting module 648 and the application running module 30 may be embodied in software program that performs above function.

The memory 50 stores the information of image effect received from the image effect setting module 648. For example, the memory may store a degree of translucency and a color of a text which is set by the user. The memory 50 can be embodied in a nonvolatile memory. The memory 50 may be included in the image processor 640.

Figure 7:
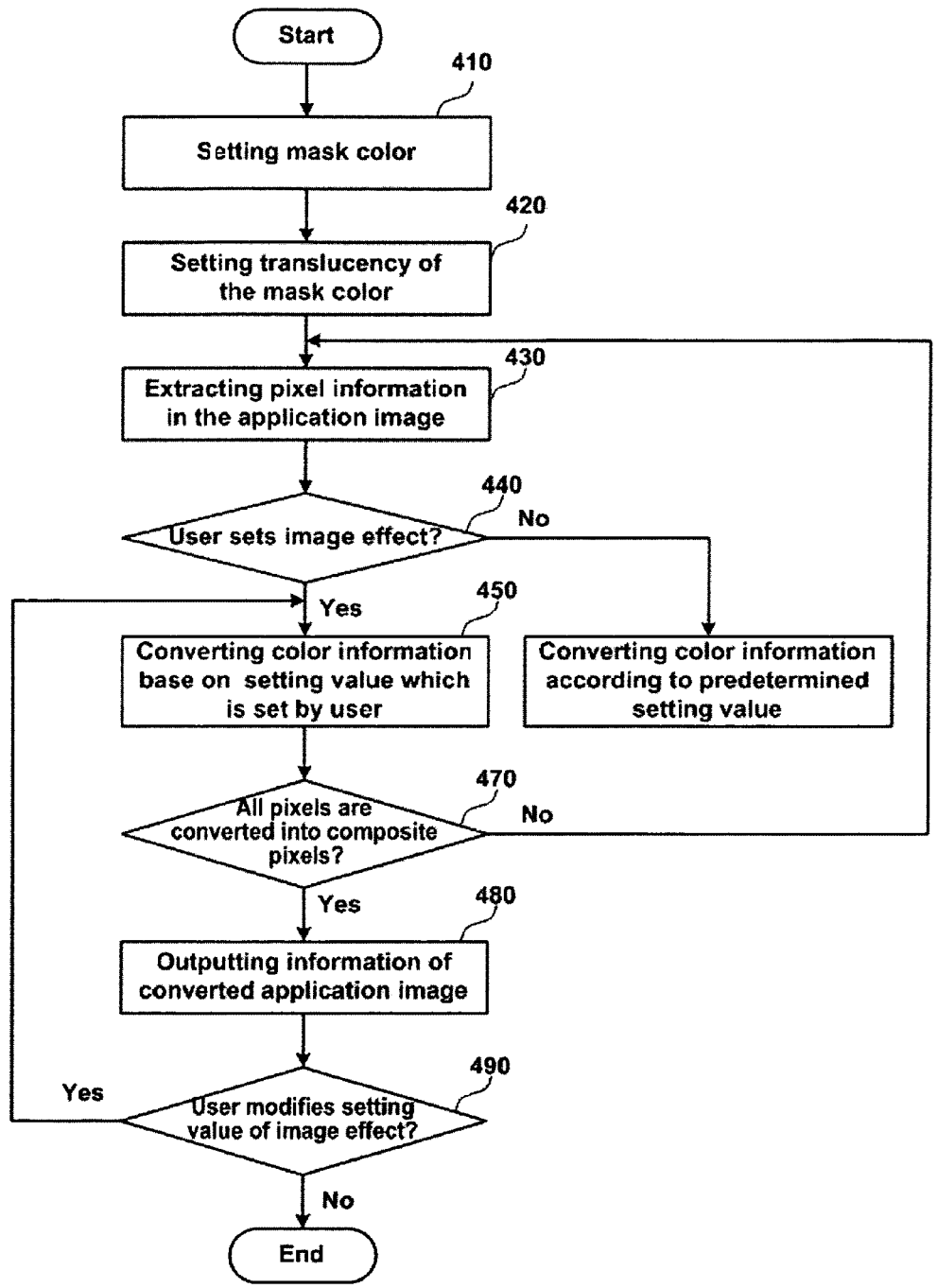
FIG. 7 is a flowchart illustrating operation of the application image layer generator shown in FIG. 6.

FIG. 7 is a flowchart illustrating operation of the application image layer generator shown in FIG. 6.

Referring to FIG. 7, in Step 410, the application image layer generator 644 receives an application image from the application running module 30, and then sets the mask color, i.e. background color of the application image layer.

And then, in Step 420, the application image layer generator 644 sets the degree of the translucency of the mask color.

Since the broadcast image layer should be overlaid with the application image layer, the application image layer generator 644 sets the degree of the translucency and the mask color as given values so that the broadcast image and the application image may be displayed at the same time on the screen.

In Step 430, the application image layer generator 644 extracts a pixel information, i.e. R, G and B, in the application image.

In Step 440, the application image layer generator 644 judges whether or not the user sets the image effect.

In Step 450, in case that the user sets the image effect, the application image layer generator 644 reads a setting value of the image effect from the memory 50, and then, the application image layer generator 644 converts color information of the application image based on the read setting value. It is assumed that the image effect may be set by user before the application image layer generator 644 processes the above operation.

For example, in case that the user sets a translucency of the application image, a translucency of a text and a color of a text, the application image layer generator 644 reads the setting values such as the translucency of the application image, the translucency of the text and the color of the text from the memory 50, and then converts a color information based on read the setting values.

In Step 460, in case that the user does not set the image effect, the application image layer generator 644 converts the color information of each pixel according to predetermined setting value.

In Step 470, the application image layer generator 644 judges whether or not all pixels converted. In case that all pixel does not converted, the operation goes to the Step 430, and the application image layer generator 644 processes the Steps 430 through 470 sequentially until all pixels are converted.

In Step 480, in case that all pixels are converted, the application image layer 644 outputs information of converted application image.

In Step 490, the application image layer generator 466 judges whether or not the user modifies the setting value of image effect while the overlay image is displayed on the display 60. In case that the user modifies the setting value of image effect, the operation goes back to the Step 450, and then the application image layer generator 466 processes the Steps 450 through 490 sequentially so that the image effect modified by the user is reflected immediately. In case that the user does not modify the image effect, the application image layer generator 644 terminates the operation of the application image layer generation.

In still another example embodiment of the present invention as illustrated in FIG. 7, the application image is generated based on image effect which is set by the user, and then the broadcast image is overlaid with the application image. Consequently, the overlay image provides enhanced visibility and readability appropriate to the user's preference and the user's recognition ability.

Figure 8:
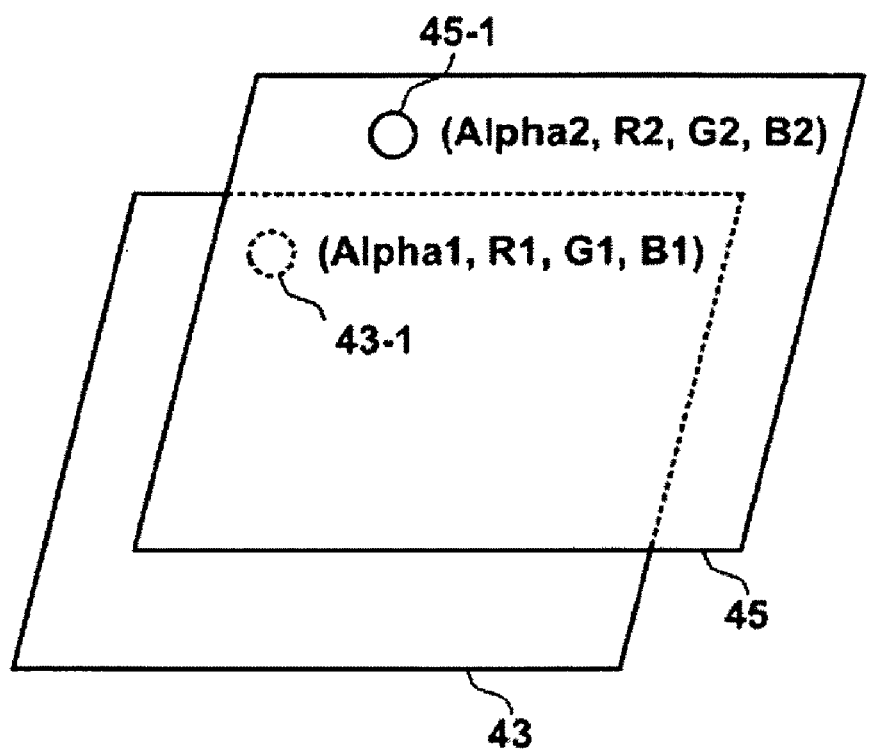
FIG. 8 is a schematic view illustrating color information of a pixel of each image layer according to one example embodiment of the present invention.

FIG. 8 is a schematic view illustrating color information of a pixel of each image layer according to one example embodiment of the present invention. In FIG. 8, the broadcast image layer 43 and the application image layer 45 has a plurality of pixels, however, one pixel is showed in each image layer for the purpose of clarity of description.

Referring to FIG. 8, the broadcast image layer 45 includes a pixel 43-1, and the application image layer includes a pixel 45-1.

The pixel 43-1 has color information such as Alpha1, R1, G1 and B1 which are converted by the broadcast image layer generator. In case that the broadcast image is represented using gray scale, the pixel 43-1 has a same value of the R1, G1 and B1(R1=G1=B1).

The pixel 45-1 has color information of Alpha2, R2, G2 and B2 which are converted by the application image layer generator. The color information of the pixel 45-1 is converted based on the setting value of image effect which is set by the user. Alternatively the color information of the pixel 45-1 is converted based on predetermined setting value of image effect.

The pixel 43-1 has a given position on the application image layer 43, and the pixel 45-1 has a position, which corresponds to the given position of the pixel 43-1, on the broadcast image layer 43.

The overlay processor generates a composite pixel which has composite color information based on the color information of the pixel 43-1 and the color information of the pixel 45-1 so that the broadcast image and the application image may be displayed at the same time on the screen.

FIGS. 9, 10, 11 and 12 are views illustrating screen images in accordance with image overlay process according to example embodiments of the present invention.

Figure 9:
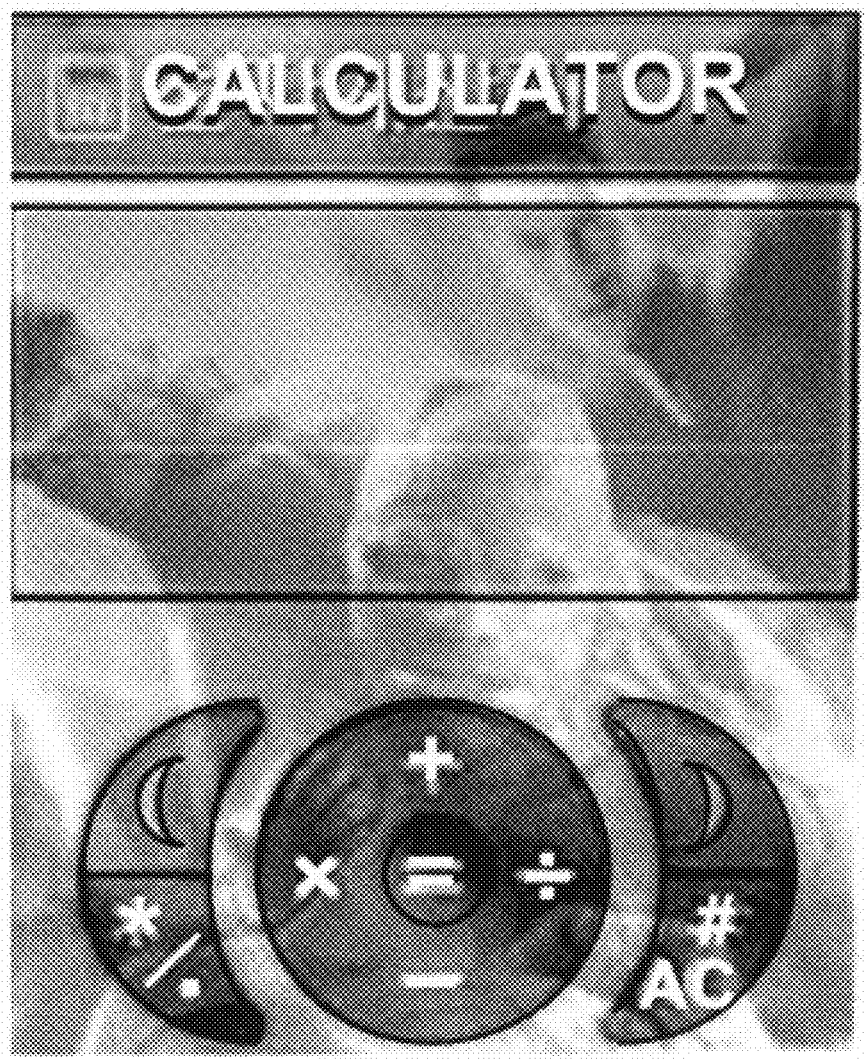
FIGS. 9, 10, 11 and 12 are views illustrating screen images in accordance with image overlay process according to example embodiments of the present invention.

FIG. 9 is a view illustrating a screen image on which a broadcast image overlaid with an application image, e.g. calculator program image. The calculator program image has a given degree of translucency that is obtained by controlling the Alpha value of each pixel which is included in the calculator program image.

Figure 10:
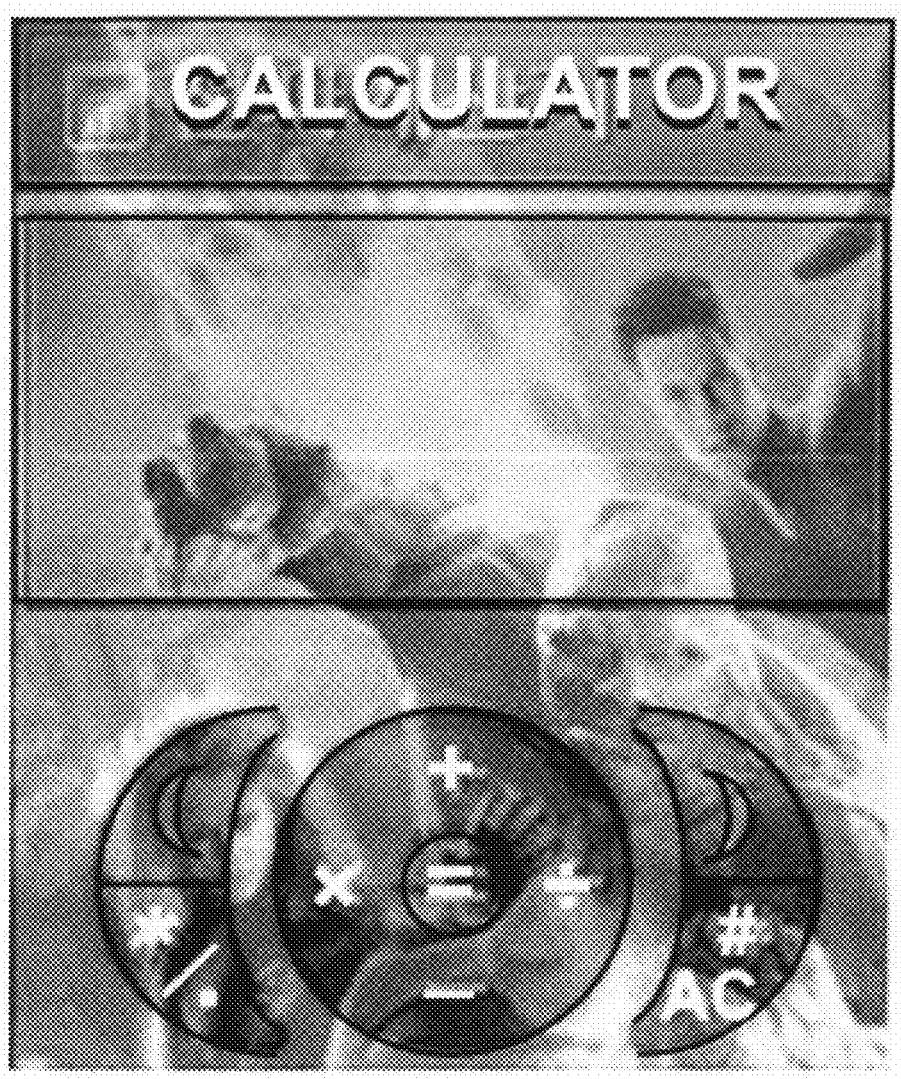

FIG. 10 is a view illustrating a screen image on which a broadcast image is overlaid with an application image, e.g. a calculator program image. The broadcast image is converted to be represented using gray scale. The calculator program image has a given degree of translucency that is obtained by controlling the Alpha value of each pixel which is included in the calculator program image.

Figure 11:

FIG. 11 is a view illustrating a screen image on which a broadcast image is overlaid with an application image, e.g. a calculator program image. In the calculator program image, each pixel included in the text is displayed such that the pixel in the text has the complementary color of the pixel, which corresponds to the pixel of the application image, on the broadcast image. Consequently, the text included in the application image is displayed such that the text in the application image has the complementary color.

Figure 12:
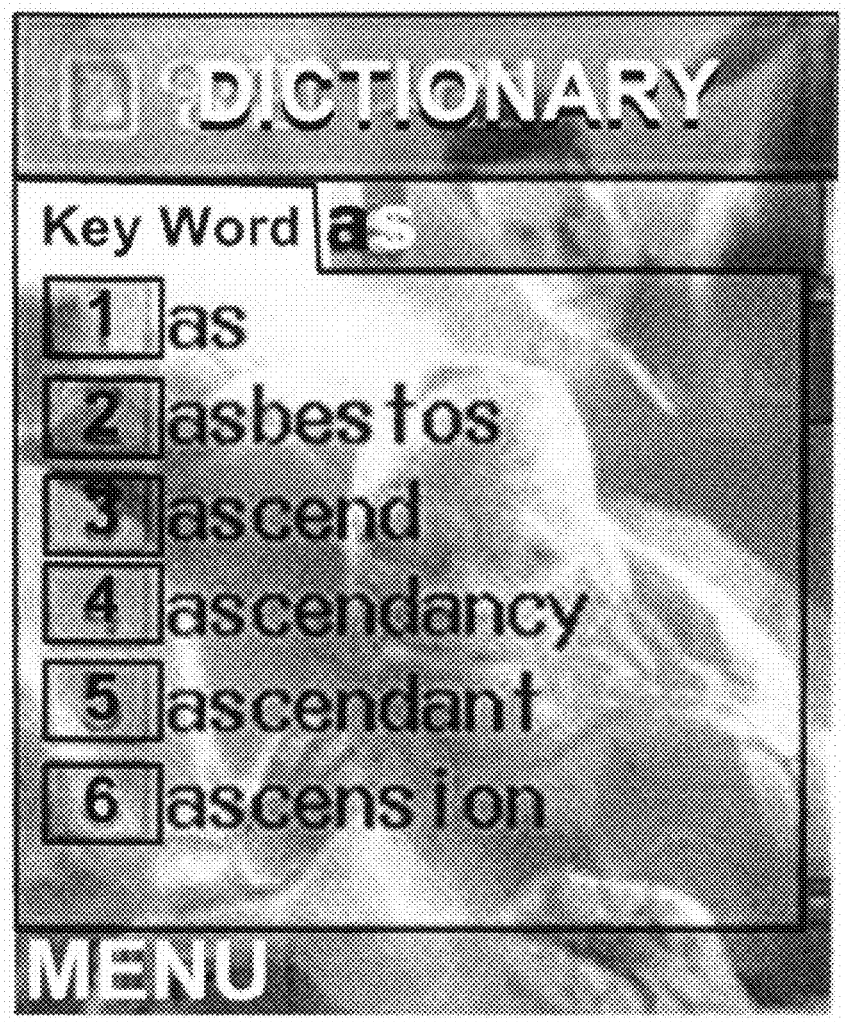

FIG. 12 is a view illustrating a screen image on which a broadcast image is overlaid with an application image, e.g. a dictionary program image. The dictionary program image has an image effect which is set by user.

Referring to FIG. 12, the user sets the text, which is input by the user, as opaquely and black so that the text input by the user may be easily to read, and may be represented easily visible.

Although above example embodiments show that the broadcast image is overlaid with the application image, one application image may be overlaid with another application image. For example, a calculator program image may be overlaid with a phone book image by controlling a degree of translucency.

For example, in case that a first application image overlaid with a second application image, the broadcast image layer generator may correspond to a first image generator which generates the first application image, and the application image generator may correspond to a second image generator which generates the second image.

The invention claimed is:

1. An apparatus for overlaying a plurality of images, comprising:
   a broadcast receiver configured to receive broadcast signals and output a video signal based on the broadcast signals,
      wherein the broadcast signals are at least one of digital multimedia broadcast signals and digital broadcast signals;
   a broadcast image layer generator configured to generate a broadcast image layer based on the output video signal;
   an application image layer generator configured to generate an application image layer based on an application image of an application while a broadcast image is being displayed,
      wherein, for each pixel in the application image, if the each pixel represents at least a portion of text, the application image layer generator adds a desired mark value representing a text pixel to the color information of the each pixel, and, if the each pixel does not represent text, the application image layer generator adds a desired Alpha value representing a degree of translucency to the color information of the pixel; and
   an overlay processor configured to generate an overlay image obtained by overlaying the broadcast image layer with the application image layer, the overlay image being based on the color information of the broadcast image layer and the application image layer and the overlay image including a simultaneous display of the broadcast image corresponding to the broadcast image layer and the application image corresponding to the application image layer,
      wherein, when the application image includes the text pixel with the mark value in the color information, the overlay processor applies a color to the text pixel based on a color of a background to identify the text pixel against the background.

2. The apparatus of claim 1, wherein, when the application image includes the text having pixels with the mark value in the color information, the overlay processor obtains an average color of a background area of the broadcast image layer corresponding to a background area of the text in the application image layer, obtains a complementary color of the average color, and sets the background area of the text in the application image layer to the average color and applies the complementary color to the text.

3. The apparatus of claim 2, wherein the background area of the text in the application image layer has dimensions corresponding to a product of a width and a height of the text, and the background area in the broadcast image layer corresponds to the background area of the text in the application image layer.

4. The apparatus of claim 1, wherein, when the application image includes the text having pixels with the mark value in the color information, for each pixel with the mark value, the overlay processor obtains a color of a corresponding pixel in the broadcast image and a complementary color of the obtained color, and applies the complementary color to the each pixel.

5. The apparatus of claim 1, wherein, when the broadcast image represents a color image, the broadcast image layer generator converts the broadcast image into a gray scale image.

6. The apparatus of claim 1, wherein the broadcast image layer generator adds a desired Alpha value to the color information of the each pixel included in the broadcast image.

7. The apparatus of claim 1, wherein the application image layer generator generates the application image layer based on a setting value of an image effect which is set by a user.

8. The apparatus of claim 1, further comprising:
   an image effect setting module configured to generate a setting value of an image effect based on an information of image effect which is set by a user, and configured to provide the setting value of the image effect to the application image layer generator.

9. The apparatus of claim 8, wherein the setting value of the image effect includes at least one of a degree of a translucency and a color information of the text in the application image.

10. A portable device having an image overlaying function comprising:
   a broadcast receiver configured to receive broadcast signals and output a video signal based on the received broadcast signals,
      wherein the broadcast signals are at least one of digital multimedia broadcast signals and digital broadcast signals;
   an application running module configured to execute an application;
   an image processor configured to generate a broadcast image layer based on the video signal, configured to generate an application image layer based on an image of the executed application while a broadcast image is being displayed, and configured to generate an overlay image obtained by overlaying the broadcast image layer with the application image layer, the overlay image being based on the color information of the broadcast image layer and the application image layer and the overlay image including a simultaneous display of the broadcast image corresponding to the broadcast image layer and the application image corresponding to the application image layer,
      wherein, for each pixel in the application image, if the each pixel represents at least a portion of text, the application image layer generator adds a desired mark value representing a text pixel to the color information of the each pixel, and, if the each pixel does not represent text, the application image layer generator adds a desired Alpha value representing a degree of translucency to the color information of the each pixel, and
      wherein, when the application image includes the text pixel with the mark value in the color information, the overlay processor applies a color to the text pixel based on a color of a background to identify the text pixel against the background; and
   a display configured to display the overlay image.

11. The portable device of claim 10, wherein, when the application image includes the text having pixels with the mark value in the color information, the image processor obtains an average color of a background area in the broadcast image layer corresponding to the background area of the text in the application image area, obtains a complementary color of the obtained average color, and sets the background area of the text in the application image layer toes the average color and applies the complementary color to the text.

12. The portable device of claim 10, wherein, when the application image includes the text having pixels with the mark value in the color information, for each pixel with the mark value, the image processor obtains a color of a corresponding pixel in the broadcast image and a complementary color of the obtained color, and applies the complementary color to the each pixel.

13. The portable device of claim 10, wherein, when the broadcast image represents a color image, the image processor converts the broadcast image into a gray scale image.

14. The portable device of claim 10, wherein the image processor generates the application image based on a setting value of an image effect which is set by a user.

15. The portable device of claim 14, further comprising a memory configured to store the setting value of the image effect.

16. A portable device, comprising:
   an application running module configured to execute at least one application;
   a display configured to display an image of the executed application;
   a first image layer generator configured to receive a first application image from the application running module to generate a first application image layer;
   a second image layer generator configured to receive a second application image from the application running module to generate a second application image layer,
      wherein, for each pixel in the application image, if the each pixel represents at least a portion of text, the application image layer generator adds a desired mark value representing a text pixel to the color information of the each pixel, and, if the each pixel does not represent text, the application image layer generator adds a desired Alpha value representing a degree of translucency to the color information of the each pixel; and
   an overlay processor configured to generate an overlay image obtained by overlaying the first application image layer with the second application image layer, the overlay image being based on the color information of the first image layer and the second image layer and the overlay image including a simultaneous display of a first image corresponding to the first application image layer and a second image corresponding to the second application image layer may,
      wherein, when the application image includes the text pixel with the mark value in the color information, the overlay processor applies a color to the text pixel based on a color of a background to identify the text pixel against the background.

17. The portable device of claim 16, wherein, when the second application image includes the text having pixel with the mark value in the color information, the overlay processor obtains an average color of a background area in the first application image layer corresponding to the background area of the text in the second application image layer, obtains a complementary color of the average color, and applies the average color to the background area in the second application image layer and applies the complementary color to the text.

18. The portable device of claim 16, wherein, when the second application image includes a text having pixels with the mark value in the color information, for each pixel with mark value, the overlay processor obtains a color of a corresponding pixel in the first application image and a complementary color of the obtained color and applies the complementary color to the each pixel.

19. A method of overlaying a plurality of images comprising:
   receiving broadcast signals and outputting a video signal based on the broadcast signals, the broadcast signals being at least one of digital multimedia broadcast signals and digital broadcast signals;
   generating a broadcast image layer based on the video signal;
   generating an application image layer based on an application image from an application while a broadcast image is being displayed; and
   generating an overlay image obtained by overlaying the broadcast image layer with the application image layer based on the color information in the application image layer, so that a broadcast image corresponding to the broadcast image layer and an application image corresponding to the application image layer may be displayed simultaneously on a screen, wherein, the generating the application image layer includes, for each pixel in the application image, if the each pixel represents at least a portion of text, adding a desired mark value representing a text pixel to the color information of the each pixel, and, if the each pixel does not represent text, adding a desired Alpha value representing a degree of translucency to the color information of the each pixel, and wherein, when the application image includes the text pixel with the mark value in the color information, the generating the overlay image includes applying a color to the text pixel based on a color of a background to identify the text pixel against the background.

20. The method of claim 19, wherein, when the application image includes the text having pixels with the mark value in the color information, the generating the overlay image includes:

obtaining an average color of a background area in the broadcast image layer corresponding to the background area of the text in the application image layer;

obtaining a complementary color of the average color;

applying the average color to the background area of the text in the application image layer; and applying the complementary color to the text.

21. The method of claim 20, wherein the background area of the text in the application image layer has dimensions corresponding to a product of a width and a height of the text, and the background area in the broadcast image layer corresponds to the background area of the text in the application image layer.

22. The method of claim 19, wherein when the application image includes the text having pixels with the mark value in the color information, the generating the overlay image includes:

for each pixel with the mark value, obtaining a color of a corresponding pixel in the broadcast image;

obtaining a complementary color of the obtained color; and applying the complementary color to the text.

23. The method of claim 19, wherein the generating the broadcast image layer includes converting the broadcast image into a gray scale image when the broadcast image represents a color image.

24. The method of claim 19, wherein the generating the application image layer generates the application image layer based on a setting value of an image effect which is set by a user.

25. The method of claim 24, wherein the setting value of image effect includes at least one of a degree of a translucency and a color information of a text which is included in the application image.

26. The method of claim 19, wherein the generating the broadcast image layer includes adding a desired Alpha value representing a degree of translucency to the color information of each pixel included in the broadcast image.

* * * * *